(12) United States Patent
Kosaka

(10) Patent No.: US 10,860,265 B2
(45) Date of Patent: *Dec. 8, 2020

(54) IMAGE FORMING SYSTEM, SERVER, IMAGE FORMING APPARATUS, AND IMAGE FORMING METHOD THAT REDUCE SERVER CAPACITY AND ALLOWS TO PULL PRINT

(71) Applicant: KYOCERA Document Solutions Inc., Osaka (JP)

(72) Inventor: Naohiko Kosaka, Concord, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/393,491

(22) Filed: Apr. 24, 2019

(65) Prior Publication Data

US 2020/0341702 A1  Oct. 29, 2020

(51) Int. Cl.
*G06F 3/12* (2006.01)
*H04N 1/00* (2006.01)
*H04N 1/44* (2006.01)

(52) U.S. Cl.
CPC .......... *G06F 3/1222* (2013.01); *G06F 3/1205* (2013.01); *G06F 3/1238* (2013.01); *G06F 3/1288* (2013.01); *H04N 1/0023* (2013.01); *H04N 1/00244* (2013.01); *H04N 1/4486* (2013.01); *H04N 2201/0094* (2013.01)

(58) Field of Classification Search
CPC .... G06F 3/1222; G06F 3/1238; G06F 3/1205; G06F 3/1288; G06F 3/1291; G06F 3/1276; H04N 1/4486; H04N 1/00244; H04N 1/0023; H04N 2201/0094; G07B 2017/0075; H04L 29/06666; H04L 63/0435; H04L 63/045; H04L 9/14
See application file for complete search history.

(56) References Cited

U.S. PATENT DOCUMENTS

| 7,016,901 B2 | 3/2006 | Eikenbery | |
| 2009/0201551 A1* | 8/2009 | Uchida | G06F 3/1288 358/1.15 |
| 2009/0284785 A1* | 11/2009 | Bando | G06F 3/1238 358/1.15 |
| 2012/0219151 A1* | 8/2012 | Mano | G06F 3/1238 380/51 |

(Continued)

*Primary Examiner* — Juan M Guillermety
(74) *Attorney, Agent, or Firm* — Hawaii Patent Services; Nathaniel K. Fedde; Kenton N. Fedde

(57) ABSTRACT

Provided is a distributed type image forming system which reduces storage capacity of server. An encryption addition part encrypts a document data for outputting by pull print with a symmetric key, encrypts the symmetric key by a public key of a user who is permitted to output of the document data, and adds the encrypted symmetric key to the document data. A division part divides document data into a job block and a user block having the symmetric key encrypted by the public key of the user and generates the blockchain of document data. A key decoding part decrypts the symmetric key included in the user block with the secret key of the user. A block acquisition part acquires other blocks from preserving apparatuses. A document reproduction part packs each block to reproduce document data. An output part outputs the reproduced document data.

13 Claims, 7 Drawing Sheets

(56) References Cited

U.S. PATENT DOCUMENTS

| | | | |
|---|---|---|---|
| 2016/0098723 A1* | 4/2016 | Feeney | G06Q 20/4016 |
| | | | 705/75 |
| 2018/0032708 A1* | 2/2018 | Mori | G06F 3/1238 |
| 2018/0115538 A1* | 4/2018 | Blake | H04L 9/3236 |
| 2019/0101896 A1* | 4/2019 | Cantrell | H04L 9/3236 |
| 2019/0311148 A1* | 10/2019 | Andrade | G06F 21/6218 |

* cited by examiner

IMAGE FORMING SYSTEM, SERVER, IMAGE FORMING APPARATUS, AND IMAGE FORMING METHOD THAT REDUCE SERVER CAPACITY AND ALLOWS TO PULL PRINT

BACKGROUND

The present disclosure relates to an image forming system, a server, an image forming apparatus, and an image forming method, especially is related with the image forming system, the server, image forming apparatus, and image forming method that can pull print.

A typical image forming apparatus, such as an MFP (Multifunctional Peripheral) that can print a document and an image, or the like, is present. An image forming system including an image forming apparatus and a server and can pull print is also present. In such system, document data that a user prints is once accumulated in the server. Then, the user can select the document data in an operation panel part of the image forming apparatus, and the document can be printed.

In such system, when registered user prints by pull print, authentication that uses a user name and a password assigned by the system, or the like, are required. On the other hand, a typical system that manages scanned data with divided memory storage when scanning a document is also known.

SUMMARY

An image forming system of the present disclosure is an image forming system including a transmitting apparatus, a document control apparatus, a preserving apparatus, and an output apparatus and allows to pull print, includes: the transmitting apparatus is provided with: an encryption addition part is configured to encrypt a document data for outputting by pull print with a symmetric key, encrypts the symmetric key by a public key of a user who is permitted to output of the document data, and adds the encrypted symmetric key to the document data, and a document transmission part is configured to transmit the document data encrypted by the encryption addition part to the document control apparatus; the document control apparatus is provided with: a document acquiring part configured to acquire the encrypted document data from the transmitting apparatus, a division part configured to generate a blockchain of the document data by dividing the document data acquired by the document acquiring part into a job block having information of the document data and a user block having the symmetric key encrypted by the public key of the user and by calculating and including a previous hash value of a previous block in order, and a storing and transmitting part configured to transmit each of the block divided by the division part to at least two of preserving apparatuses; the preserving apparatus is provided with: a storing part configured to store the block received from the document control apparatus, and an outputting and transmitting part configured to transmit the block stored in the storing part according to an instruction from the output apparatus; and the output apparatus is provided with: a key decoding part configured to decrypt the symmetric key included in the user block by a secret key of the user, a block acquisition part configured to acquire the other blocks from the preserving apparatuses when the symmetric key is decoded by the key decoding part, a document reproduction part configured to pack each block acquired by the block acquisition part and reproduce the document data, and an output part configured to output the document data reproduced by the document reproduction part.

A server of the present disclosure is a server includes: a document acquiring part configured to acquire encrypted document data; a division part configured to generate a blockchain of the document data by dividing the document data acquired by the document acquiring part into a job block having information of the document data and a user block having a symmetric key encrypted by a public key of a user and by calculating and including a previous hash value of a previous block in order; and a storing and transmitting part configured to transmit each of the block divided by the division part to at least two of preserving apparatuses.

An image forming apparatus of the present disclosure is an image forming apparatus includes: a key decoding part configured to decrypt a symmetric key included in a user block of a blockchain of document data by a secret key of a user; a block acquisition part configured to acquire other blocks of the blockchain when the symmetric key is decoded by the key decoding part; a document reproduction part configured to pack each block acquired by the block acquisition part and reproduce the document data; and an output part configured to output the document data reproduced by the document reproduction part; wherein the output part requests a plurality of preserving apparatuses for confirmation and adds a printing block that indicates record of an output to the user block after the confirmation.

An image forming method of the present disclosure is an image forming method executed by an image forming system including a transmitting apparatus, a document control apparatus, a preserving apparatus, and an output apparatus and allowing for pull print, including the steps of: by the transmitting apparatus, encrypting a document data for outputting by pull print with a symmetric key, encrypting the symmetric key by a public key of a user who is permitted to output of the document data, and adding the encrypted symmetric key to the document data; by the transmitting apparatus, transmitting the encrypted document data to the document control apparatus; by the document control apparatus, acquiring the encrypted document data from the transmitting apparatus; by the document control apparatus, generating a blockchain of the document data by dividing the acquired document data into a job block having information of the document data and a user block having the symmetric key encrypted by the public key of the user and by calculating and including a previous hash value of a previous block in order; by the document control apparatus, transmitting each of the divided block to at least two of preserving apparatuses; by the preserving apparatus, storing the block received from the document control apparatus; by the preserving apparatus, transmitting the stored block according to an instruction from the output apparatus; by the output apparatus, decrypting the symmetric key included in the user block by a secret key of the user; by the output apparatus, acquiring the other blocks from any one of the preserving apparatuses when the symmetric key is decoded; by the output apparatus, packing each of acquired block and reproducing the document data; and by the output apparatus, outputting the reproduced document data.

DETAILED DESCRIPTION

Embodiment

Figure 1:
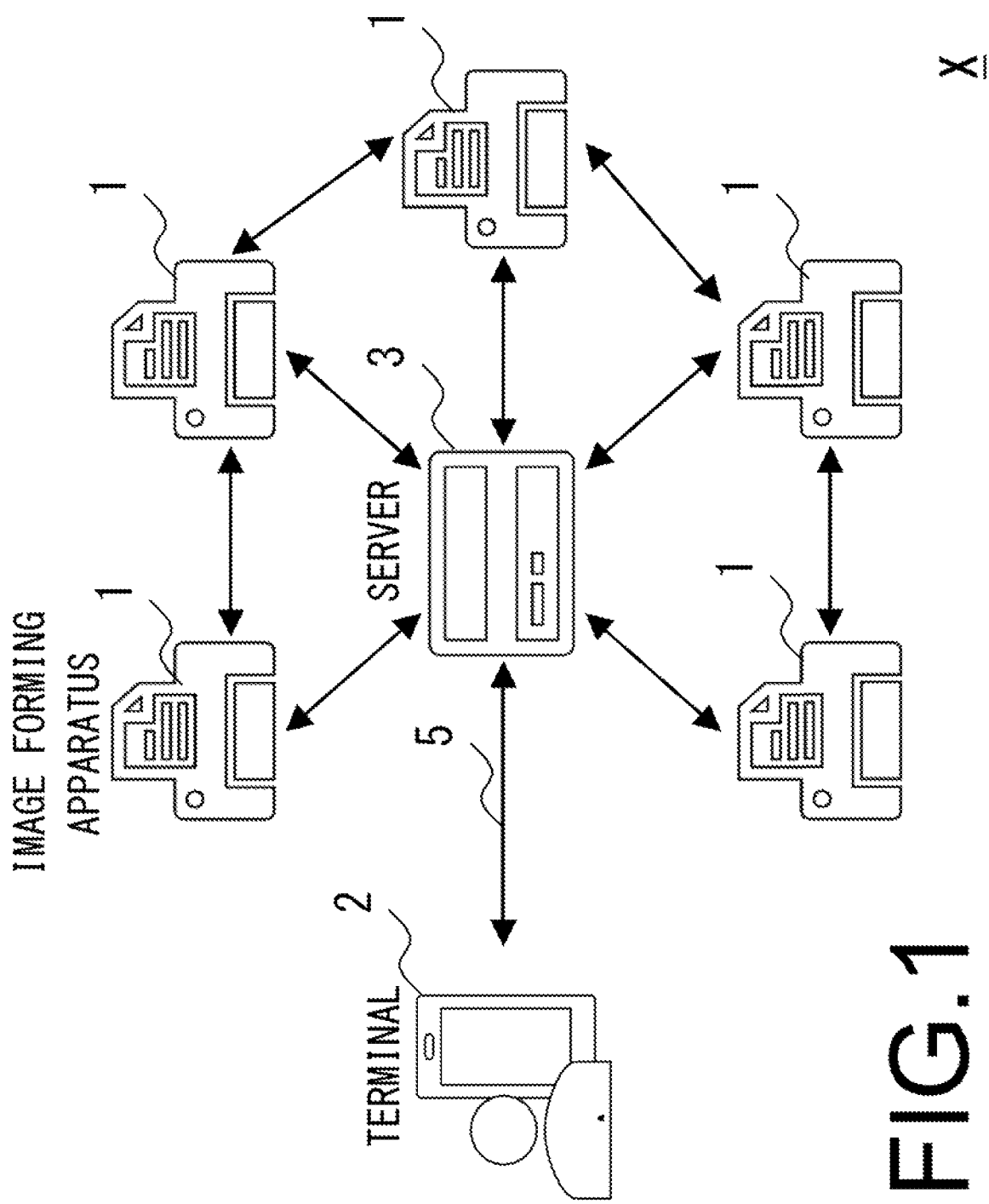
FIG. 1 is a system configuration figure of an image forming system according to the embodiment of the present disclosures.

[System Configuration of Image Forming System X]

Firstly, with reference to FIG. 1-FIG. 4, the system configuration of image forming system X according to the embodiment of the present disclosures is explained. Here, image forming system X of the present embodiment is a printing system including a plurality of image forming apparatuses 1, terminal 2, and server 3 that can pull print. In image forming system X of the present embodiment, each image forming apparatus 1, terminal 2, and server 3 are connected via network 5 indicated with connecting lines in this figure. Here, in the present embodiment, each image forming apparatus 1, terminal 2, and server 3 can connect with a PtP (Peer to Peer, P2P) network.

Image forming apparatus 1 is an apparatus, such as an MFP, a network scanner, a document scanner, a network FAX, a printer, or the like, that can transmit and receive various data. Image forming apparatus 1 can output document data 200 (FIG. 5) created in terminal 2 by performing pull printing, direct printing, copying, scanning, facsimile transmission, or the like. In this case, in the present embodiment, image forming apparatus 1 pull prints by functioning as a preserving apparatus and an output apparatus, which are described later.

Terminals 2 is a terminal, such as PC, a mobile phone, a smart phone, PDA (Personal Data Assistant), a business-use terminal, a dedicated terminal, or the like. As for terminal 2, a various kind of general-purpose OS (Operating System), or the like, is working. Also, terminal 2 can perform installation of a control programs, such as a device driver for image forming apparatus 1, or the like. Thereby, by OS and various application software (hereinafter, it only call as an "application"), a function, such as a pull print, direct printing, a scan, FAX transmission and reception, network FAX, or the like, is possible to be used. In the present embodiment, terminal 2 functions as a transmitting apparatus, which creates document data 200 (FIG. 5) for a pull print by using an application and transmits it.

Server 3 is a document control apparatus, which manages document data 200 (FIG. 5) and is a server for pull printing in the present embodiment. Server 3 can transmit and receive various data between terminal 2 and image forming apparatus 1. In the present embodiment, servers 3 may be a main frame, PC (Personal Computer) server, NAS (Network Attached Storage), or the like. Server 3 executes versatile OS (Operating System), such as Linux®, Windows®, or the like, and provides various kinds of services (daemons) on OS.

In addition, as a direct output, server 3 can make document data 200 (FIG. 5) output in image forming apparatus 1, directly. Server 3 may also be capable of storing, managing, charging, authorizing, or the like, document data 200. Also, server 3 may store document data 200 in a document box (a shared folder, a storage folder) associated with the user. Further, server 3 may possible to perform a transmitting process to DMS (Document Management System) for business or office work, or the like.

Network 5 is an intranet such as like LAN (Local Area Network), WAN (Wide Area Network) such as like the Internet, a mobile phone network, or the like. When network 5 is LAN, it may be the wireless LAN of WiFi, or the like. When network 5 is WAN, it can connect with a server on so-called "cloud" via a router, a gateway, or the like. Also, a plurality of networks may be connected to network 5 by VPN (Virtual Private Network), bridge, or the like.

(Configuration of Image Forming Apparatus 1)

Figure 2:
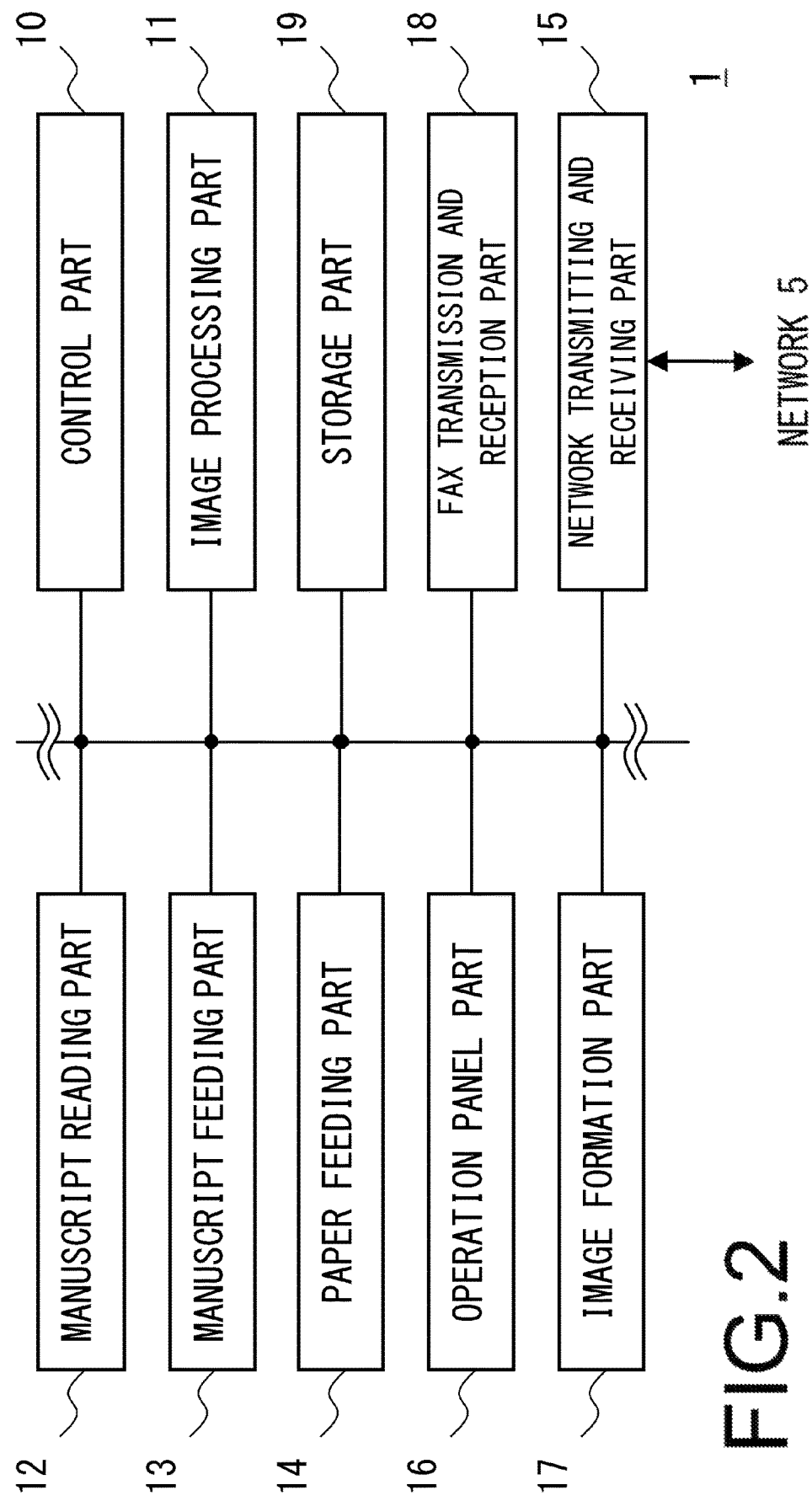
FIG. 2 is a block diagram showing the control configuration of the image forming apparatus as shown in FIG. 1.

Then, referring to FIG. 2, a control configuration of image forming apparatus 1 is described. Image forming apparatus 1 includes control part 10, image processing part 11, manuscript reading part 12, manuscript feeding part 13, paper feeding part 14, network transmitting and receiving part 15, operation panel part 16, image formation part 17 (image forming part), FAX transmission and reception part 18, and storage part 19, or the like. Each part is connected with control part 10 and is operation-controlled by control part 10.

Control part 10 is an information processing part, such as GPP (General Purpose Processor), CPU (Central Processing Unit, central processing unit), MPU (Micro Processing Unit), DSP (Digital Signal Processor), GPU (Graphics Processing Unit), ASIC (Application Specific Integrated Circuit, processor for particular applications), or the like. Control part 10 reads the control program stored in ROM and HDD of storage part 19, expands the control program to RAM, executes it, and thus is operated as each part of the functional block as described later. Also, control part 10 controls a whole apparatus corresponding to specified instruction information inputted from terminal 2 or operation panel part 16.

Image processing part 11 is control arithmetic part, such as DSP (Digital Signal Processor), GPU (Graphics Processing Unit), or the like. Image processing part 11 performs specified image processing for image data. The specified image processing may be a process of scaling, concentration tuning, gradation adjustment, image improvement, or the like, for example. Also, image processing part 11 stores the image read by manuscript reading part 12 as print data to storage part 19. In this case, image processing part 11 is also possible to convert the print data into an electronic document, such as PDF (Portable Document Format), a various file, such as a word processor and a spreadsheet, a file of image data, such as TIFF and a bitmap, or the like, (hereinafter, it simply called as PDF, or the like.). Also, the image processing part 11 may be capable of executing at least a part of processing of OCR (Optical Character Recognition).

Manuscript reading part 12 reads a set manuscript. Also, manuscript reading part 12 is arranged on the upper part of the body part of image forming apparatus 1. Manuscript reading part 12 is provided with a scanner, platen glass, and a manuscript reading slit. Manuscript reading part 12, when reading the manuscript placed on platen glass, moves the scanner to a position which faces to platen glass, reads with scanning the manuscript placed on platen glass, acquires image data, and outputs the acquired image data to control part 10.

Also, manuscript reading part 12, when reading the manuscript fed from manuscript feeding part 13, moves the scanner to a position that faces to the manuscript reading slit. Then, manuscript reading part 12 reads the manuscript in synchronization with the manuscript feeding operation by the manuscript feeding part 13 via the manuscript reading slit and acquires the image data. Manuscript reading part 12 outputs the acquired image data to control part 10.

Manuscript feeding part 13 conveys the manuscript read by manuscript reading part 12. Manuscript feeding part 13 is arranged on the upper part of manuscript reading part 12. Manuscript feeding part 13 is provided with a manuscript mounting part and a manuscript transport mechanism. Manuscript feeding part 13 sequentially-feeds the manuscript placed on the manuscript mounting part one by one by the manuscript transport mechanism and feeds the manuscript to the document reading part 12.

Paper feeding part 14 feeds the recording paper one by one toward the image forming part 17. Paper feeding part 14 is provided in the body part.

Network transmitting and receiving part 15 is a network connection part including a LAN board, a wireless transmitter receiver, or the like, for connecting with an external network, such as LAN, wireless LAN, WAN, and a mobile phone network, or the like. Network transmitting and receiving part 15 transmits and receives data by the line for data communications and transmits and receives an audio signal by a voice call line.

Operation panel part 16 is provided with input part, such as a button, a touch panel, or the like, and a display part, such as LCD (Liquid Crystal Display), an organic electroluminescence display, or the like. Also, operation panel part 16 is arranged in front-side of image forming apparatus 1. The button of the input part in operation panel part 16 is a button that perform instructions related to a numeric keypad, a start, a cancel, switching of operational mode, executing of a job, or the like. The operational mode may be provided with a type of mode of copying, FAX transmission, scanner, network scanner, or the like. Also, the job includes printing, transmission, storage, record, or the like, for the selected document.

The input part of operation panel part 16 acquires instructions of the various jobs of image forming apparatus 1 by a user. In the present embodiment, inputting a password for user login, or the like, is possible. Further, selecting document data 200 (FIG. 5) for pull print, inputting character, numerical value, or the like, for secret key 240 of a user, or the like, is also possible. Also, by user instructions acquired from operation panel part 16, it is also possible to input and change the information of each user. Further, in the present embodiment, operation panel part 16 may be provided with a transmission and reception circuit and antenna of short-range wireless. Inputting secret key 240 is also possible by connecting image forming apparatus 1 serving as the output apparatus and terminal 2 with this short-range wireless.

Image formation part 17 is an image forming part in the present embodiment. Image formation part 17 performs the image formation from the data stored in storage part 19, read by manuscript reading part 12, or acquired from terminal 2 to a recording paper. Image formation part 17 is provided with a photo conductor drum, an exposure part, a developing part, a transfer part, a fixing part, or the like. Image formation part 17 records a toner image on a recording paper by performing an image formation process including charging, exposure, development, transfer, and fixing.

FAX transmission and reception part 18 transmits and receives a facsimile. FAX transmission and reception part 18 performs facsimile reception from other FAX equipment by a sound line and stores it in storage part 19 and can perform image formation by image formation part 17. Also, FAX transmission and reception part 18 can convert the data of the manuscript read by manuscript reading part 12 or the data of network FAX transmitted from terminal 2 to image data and can perform facsimile transmission to other FAX equipment by the sound line.

Storage part 19 is a storage part by using a non-transitory recording medium. Storage part 29 may include, for example, various RAM (Random Access Memory) as a main memory part. Also, storage part 29 may include, for example, ROM (Read Only Memory), eMMC (embedded Multi Media Card), SSD (Solid State Drive), HDD (Hard Disk Drive), or the like, as an auxiliary memory part. The main memory part of storage part 19 may keep memory contents by function, such as self refreshing, or the like, when being a power saving state. The control program for operation-controlling image forming apparatus 1 is stored in the auxiliary memory part of storage part 19. In addition, storage part 19 has also stored user account settings. Also, the area of the storage folder for each user may be included in storage part 19.

In addition, in image forming apparatus 1, control part 10 and image processing part 11 may be integrally-formed as like CPU with built-in GPU, a chip-on module package, SOC (System On a Chip), or the like. Also, control part 10 and image processing part 11 may include built-in RAM, ROM, flash memory, or the like.

(Configuration of Terminal 2)

Figure 3:
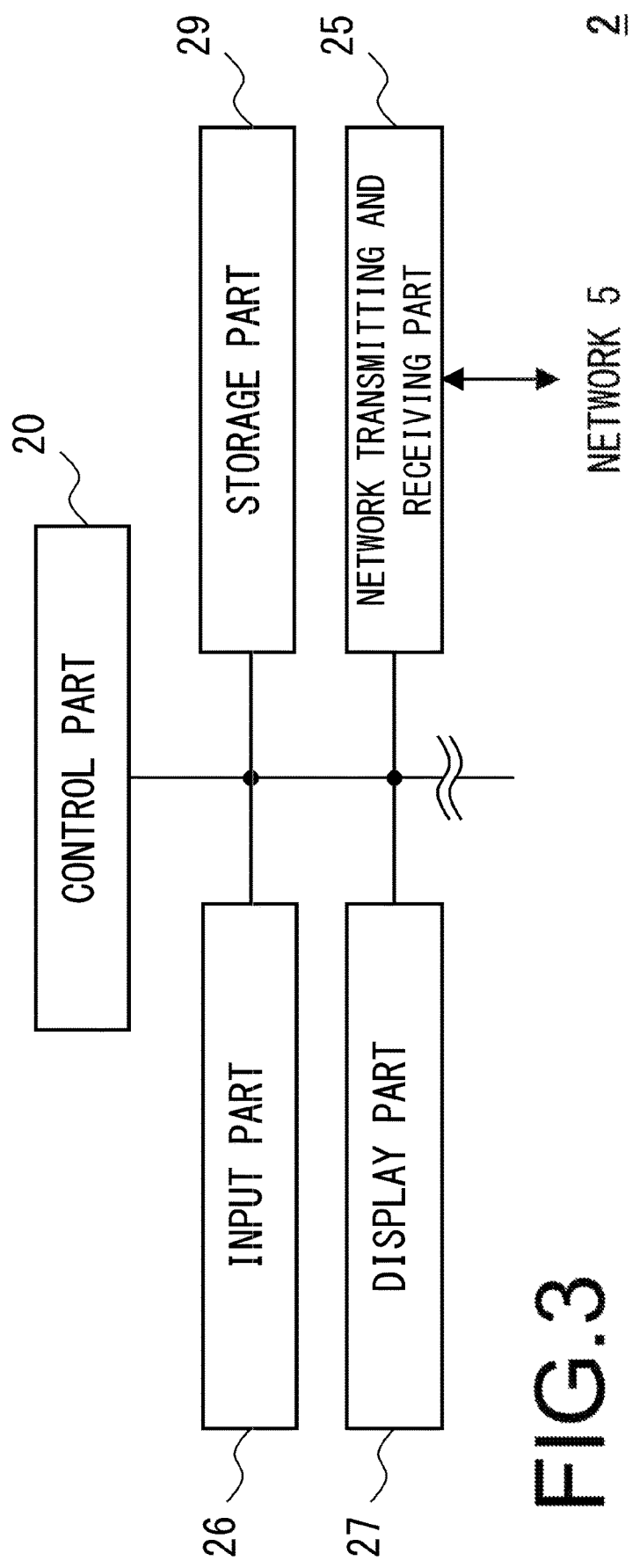
FIG. 3 is a block diagram showing the control configuration of the terminal as shown in FIG. 1.

Then, referring to FIG. 3, the configuration of terminal 2 is described. Terminal 2 is provided with control part 20, network transmitting and receiving part 25, input part 26, display part 27, and the storage part 29, or the like.

Control parts 20 is information processing part, such as GPP, CPU, MPU, DSP, GPU, ASIC, or the like.

Input parts 26 are a keyboard, various sensors, a pointing device, or the like, for acquiring a various instructions by a user. The pointing device includes a touch panel, a digitizer, a touchpad, or the like. Input part 26 can make various instructions input by a user and can acquire this by GUI (Graphical User Interface) on OS. Also, by instructions which the user inputted by input part 26, a process that creates and transmits document data 200 (FIG. 5), inputs and changes information of each user, or the like, is also possible.

Display parts 27 is a flat display panels, such as LCD, an organic electroluminescence display, FED, and a fluorescent display tube, a projector, LED for status displays, or the like. Display part 27 can display the various operation screens associating with GUI. In addition, input part 26 and display part 27 may be integrally-formed as like a display with a touch panel or a digitizer.

Network transmitting and receiving part 25 is a network connection part including a LAN board, a wireless transmitter receiver, or the like, for connecting with network 5.

Storage part 29 is a storage part that uses a non-transitory recording medium. Storage part 29 may include RAM, ROM, eMMC, SSD, HDD, or the like. Also, storage part 29 may include external storages, such as various flash memories and an optical recording medium, or the like. Also, storage part 29 may store a serial number or unique ID for specifying the self-apparatus, versions of OS, firmware, and a device driver, or the like, and an apparatus ID, which is an IP address, a MAC Address, or the like.

Also, a control program for operation-controlling terminal 2 is stored in the auxiliary memory part of storage part 29.

In the control program, a programs and data, which is OS, various applications, or the like, are included. Also, the control program includes a middleware that works on OS, the device driver that controls image forming apparatus 1, or the like.

In addition, control part 20 may have built-in RAM, ROM, a flash memory, or the like. Also, control part 20 reads the control program stored in storage part 29, expands the control program, executes it, and operates as each part of the functional block as described later.

(Configuration of Server 3)

Figure 4:
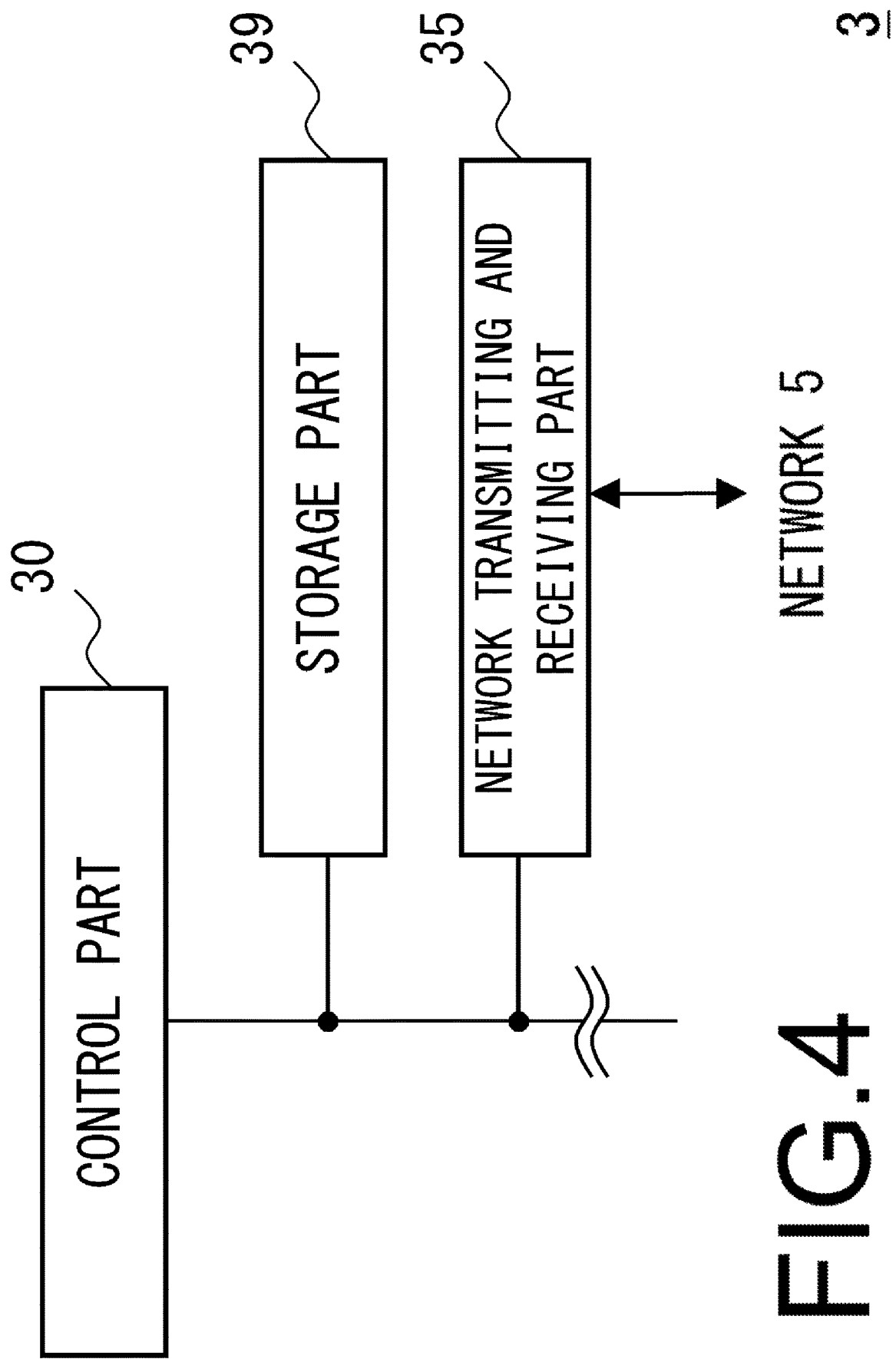
FIG. 4 is a block diagram showing the control configuration of the server as shown in FIG. 1.

Then, referring to FIG. 4, configuration of server 3 is described. Server 3 provides control part 30, network transmitting and receiving part 35, and the storage part 39, or the like.

Control part 30 is information processing parts, such as GPP, CPU, MPU, DSP, GPU, and ASIC, or the like.

Network transmitting and receiving part 35 is a network connection part including a LAN board, a wireless transmitter receiver, or the like, for connecting with network 5.

Storage part 39 is a storage part that uses a non-transitory recording medium. Storage part 39 may include RAM, ROM, eMMC, SSD, HDD, or the like. A control program for operation-controlling server 3 is stored in storage part 39. The control program includes a programs and data of OS, a service (daemon) for realizing pull print, a device driver, various applications, or the like. The service (daemon) may be, for example, WWW server by using HTTP protocol, a server program by using various protocol, or the like. Also, storage part 39 may include external storages, such as various flash memories and an optical recording medium, or the like.

[Functional Configuration of Image Forming System X]

Figure 5:
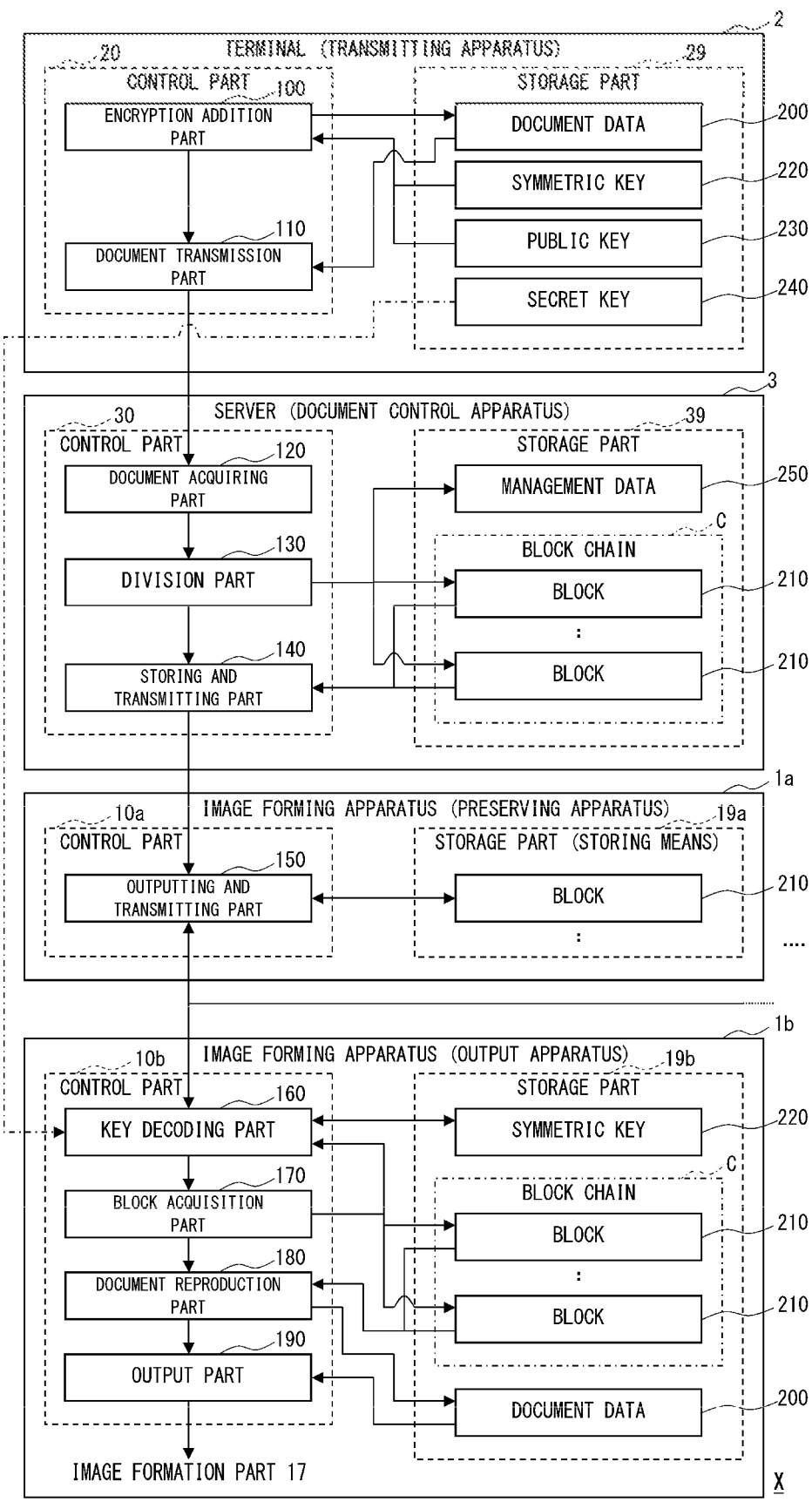
FIG. 5 is a block diagram showing the functional configuration of the image forming system according to the embodiment of the present disclosures.

Here, with reference to FIG. 5, a functional configuration of image forming system X according to the embodiment of the present disclosures is explained. In image forming system X of the present embodiment, when document data 200 is printed by the user in terminal 2, it is encrypted, and document data 200 is once be transmitted to server 3 after various processing as described later.

Server 3 acquires document data 200 from terminal 2, once spools as queue Q, divides into blockchain C, and stores management data 250 of the acquired document data 200 in storage part 19. Then, server 3 transmits each block 210 of blockchain C to image forming apparatus 1a (preserving apparatus). In pull print, instructions from image forming apparatus 1b (output apparatus) make it possible to acquire each block 210 and to make document data 200 reproduce and output. The details of pull print are described later.

Image forming apparatus 1a is image forming apparatus 1 that functions as a preserving apparatus of the present embodiment. Image forming apparatus 1a stores anyone of blocks 210 of blockchain C and transmits it with an instruction from the output apparatus.

Image forming apparatus 1b is image forming apparatus 1 that functions as an output apparatus of the present embodiment. Image forming apparatus 1b, when document data 200 in which the user is printed is selected in operation panel part 16, acquires each block 210 from the preserving apparatus, reproduces to document data 200, and prints it.

In the present embodiment, an example that terminal 2 is a transmitting apparatus, server 3 is a document control apparatus, image forming apparatus 1a is one of the preserving apparatuses, image forming apparatus 1b is an output apparatus is explained.

Then, details are explained. Control part 20 of terminal 2 is provided with encryption addition part 100 and document transmission part 110. Storage part 29 stores document data 200, symmetric key 220, public key 230, and secret key 240. Control part 30 of server 3 is provided with document acquiring part 120, division part 130, and storing and transmitting part 140. Storage part 39 stores management data 250 and block 210. In addition, document data 200 is also stored in storage part 39, temporarily. Control part 10a of image forming apparatus 1a is provided with outputting and transmitting part 150. Storage part 19a stores block 210. Control part 10b of image forming apparatus 1b is provided with key decoding part 160, block acquisition part 170, document reproduction part 180, and output part 190. Storage part 19b stores document data 200, block 210, and symmetric key 220. In addition, data stored in storage part 29, storage part 39, storage part 19a, and storage part 19b, may be different depending on a stage of processing.

Encryption addition part 100 encrypts document data 200 to output for pull print, which is printed on the application of terminal 2, with symmetric key 220. Further, encryption addition part 100 encrypts symmetric key 220 with public key 230 of a user who permits to output document data 200, and it adds encrypted symmetric key 220 to document data 200.

Document transmission part 110 transmits document data 200 encrypted by encryption addition part 100 to server 3.

Document acquiring part 120 acquires encrypted document data 200 transmitted by document transmission part 110 in terminal 2. This acquired document data 200 is stored in storage part 39, temporarily.

Division part 130 divides document data 200 acquired by document acquiring part 120 into block 210. According to the present embodiment, division part 130 divides it into job block 210a, which includes information of document data 200, and user block 210b, which symmetric key 220 is encrypted by a user public key 230 and is included. Then, division part 130 generates blockchain C of document data 200 by calculating previous hash value 320 of previous block 210 and by including it to blocks 210 in order.

In addition, division part 130 can also include print setting 340, which has settings of permission of printing for each user, in user block 210b. Further, Division part 130 may also include block 210c, which indicates the last of user block 210b, in blockchain C. Furthermore, division part 130 can also add printing block 210d, which indicates record of an output, to user block 210b. In this case, outputting and transmitting part 150 of a plurality of image forming apparatuses 1a is requested for confirmation about addition of printing block 210d.

Storing and transmitting part 140 transmits each of block 210 divided by division part 130 to at least two of preserving apparatuses. In this case, storing and transmitting part 140 decreases priority of transmission of block 210 to the preserving apparatus that is likely to be in an offline state. On the contrary, storing and transmitting part 140 may increase the priority of transmission of block 210 to the preserving apparatus that has high processing capacity and/or installation years is new. In addition, storing and transmitting part 140 may suppress transmission of block 210 to the preserving apparatus that is predicted to be in an error.

Outputting and transmitting part 150 stores block 210 received from server 3 in storage part 19a, which is a storing part. That is, in the present embodiment, storage part 19a functions as the storing part. Outputting and transmitting part 150 transmits block 210 stored in storage part 19a by an instruction from the output apparatus. In addition, outputting and transmitting part 150 records history about transmission of block 210 in storage part 19*a*. Thereby, checking is also possible about addition of printing block 210*d* to user block 210*b* (FIG. 6) for each user.

Key decoding part 160 decrypts symmetric key 220 included in user block 210*b* by secret key 240 for the user. In the present embodiment, the user may input this secret key 240 for the user, which is displayed on the display part 27 in terminal 2, or the like, in operation panel part 16.

Block acquisition part 170 acquires other blocks 210 from any one of the preserving apparatuses when symmetric key 220 is able to be decoded by key decoding part 160. In this case, block acquisition part 170 acquires each block 210 of document data 200 corresponding to job information 400 from any one of the preserving apparatuses and stores it in storage part 19*b*. Block acquisition part 170 calculates previous hash value 320 from last block 210 in the order of blockchain C to the first block 210, repeatedly, and acquires right block 210.

Document reproduction part 180 packs each block 210 acquired by block acquisition part 170, reproduces to document data 200, and stores in storage part 19*b*.

Output part 190 outputs document data 200 reproduced by document reproduction part 180. Output part 190 transmits document data 200 stored in storage part 19*b* to image formation part 17 and performs image formation and printout it.

Document data 200 is, for example, a file of the "job" for pull printing, which is designated the pull print and is printed in settings of the device driver from the application of terminal 2. This document data 200 is may be written in PDL (Page Description Language), or the like, for example. Otherwise, document data 200 may be, for example, an electronic document data, such as PDF, a file of a word processor or a spreadsheet, various image data, or the like. Further, in the present embodiment, document data 200 is encrypted with symmetric key 220. Furthermore, in the present embodiment, print setting 340 is stored in document data 200 as metadata. These are set in block 210 as described later.

Block 210 is a block of the data that configures blockchain C. The details of the configuration of blockchain C are as described later.

Symmetric key 220 is key data used for a symmetric-key cryptosystem or a common key cryptosystem. In the present embodiment, symmetric key 220 is used when encrypting as a whole document data 200. For example, symmetric key 220 is a random character string or a random number, and it has sufficient sizes (length) to prevent a brute force attack, or the like. Furthermore, in the present embodiment, the same symmetric key 220 is usually used in a single system or in groups or organization units.

Public key 230 is key data for encryption used for PGP (Pretty Good Privacy), or the like. In the present embodiment, the number of public keys 230 is set as many as the number of users.

Secret key 240 is key data used for PGP, or the like, to decrypt data encrypted with public key 230. In the present embodiment, secret keys 240 are also set as many as the provided public keys 230. Secret key 240 is stored only in terminal 2.

Management data 250 is a database including job information 400 of document data 200 and data indicating at least the transmission destination of job block 210*a* of blockchain C, or the like.

Figure 6:
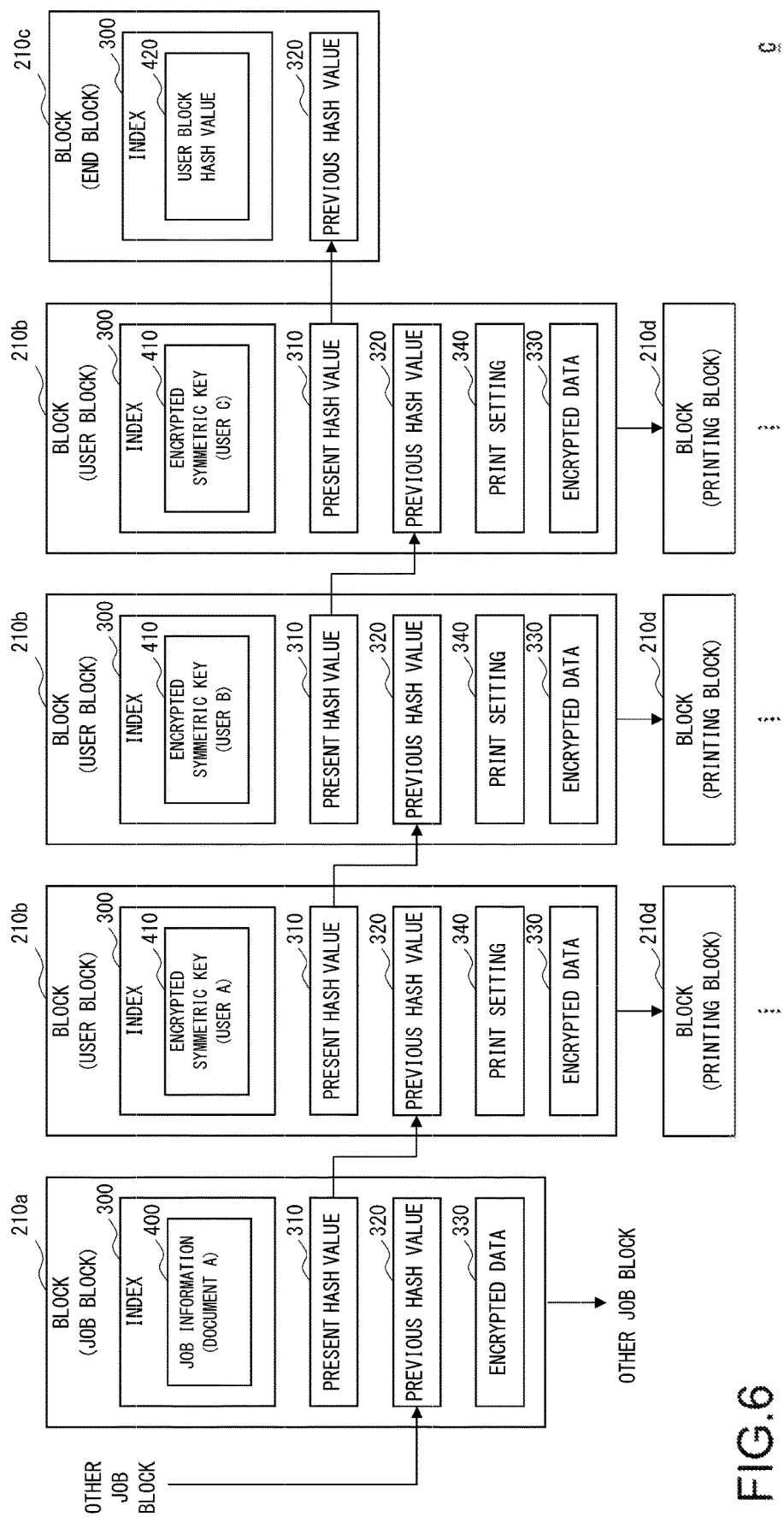
FIG. 6 is a block diagram showing the detailed configuration of the blockchain as shown in FIG. 4.

Then, as refer to FIG. 6, the details of blockchain C is explained. In the present embodiment, each block 210 is classified into job block 210*a*, user block 210*b*, end block 210*c*, and printing block 210*d*. Hereinafter, when referring to any one of these, it is referred to as block 210, simply. Furthermore, user block 210*b* is set up as much as the printable user. In the present embodiment, each block 210 among these is two-dimensionally connected as a data structure. Each block 210 includes index 300, present hash value 310, previous hash value 320, print setting 340, and encrypted data 330, or the like, suitably.

Index 300 is header data of each block 210, or the like. The header data includes, for example, data of an identifier indicating as it is block 210 of image forming system X, a type ID indicating the type of each block 210, a number of the arrangement order of each block 210, and each definition of a data structure, a type of cipher system, or the like.

Present hash value 310 is a hash value of encrypted data 330 of this block 210. Otherwise, present hash value 310 may be a calculated entire hash value of this block 210. The hash value can be calculated by various hash functions, such as generating a bit string of fixed length without regularity from a bit string of arbitrary length. The following hash value can be calculated by a similar kind of hash function.

Previous hash value 320 is a hash value of encrypted data 330 of previous block 210. This value is, for example, in the arrangement order included in index 300, it may be the present hash value 310 of previous block 210 is copied and stored.

Encrypted data 330 is a main part of the data in which encrypted document data 200 is divided.

Print setting 340 is setting data including setting of permission of printing for each user. Print setting 340 includes, for example, information on restrictions such as the number of times (restriction) printable for the user, the number of copies, the number of sheets, the time, or the like. In addition, print setting 340 includes settings, such as permission of color or black-and-white printing, a watermark, permitted option equipment, or the like. Further, the user data may be included in print setting 340. Specifically, print setting 340 may include a character string including ID and date for identifying the user, other information, or the like.

In detail, in the present embodiment, index 300 includes job information 400, encrypted symmetric key 410, and user block hash value 420, or the like.

Job information 400 is information for identifying document data 200. For example, job information 400 may be the hash value of entire encrypted document data 200. That is, the hash value of the file in the state before document data 200 being encrypted and being divided into block 210 may be used as job information 400.

Encrypted symmetric key 410 is data of symmetric key 220 encrypted with public key 230 of each user who is permitted to output document data 200. According to the present embodiment, encrypted symmetric key 410 is encrypted by encryption addition part 100 of terminal 2 and is added to document data 200.

User block hash value 420 is a hash value of the entire user block 210*b*.

Here, the type of each block 210 is set up by the data included in index 300. In the present embodiment, as types of block 210, job block 210*a*, user block 210*b*, end block 210*c*, and printing block 210*d* are used.

In detail, job block 210*a* includes job information 400 in index 300. In FIG. 6, an example that a block including job information 400 that defines blockchain C of the job of "document A", which is document data 200, is job block 210*a* is shown. User block 210*b* includes encrypted symmetric key 410 in index 300. In FIG. 6, an example that each block indicates user block 210b of user A, user B, user C, and user D is shown. End block 210c includes user block hash value 420 in index 300. Printing block 210d is set type ID, which indicates as printing block, in index 300.

In addition, data other than these may be added depending on the type of block 210. Furthermore, each type of block may be configured of a plurality of blocks 210 instead of a single block corresponding to the length (size), or the like, of document data 200.

Here, control part 10 of terminal 2 executes the control program stored in storage part 29 and is functioned as encryption addition part 100 and document transmission part 110. Control part 30 of server 3 executes the control program stored in storage part 39 and is functioned as document acquiring part 120, division part 130, and storing and transmitting part 140. Control part 10a of image forming apparatus 1a executes the control program stored by storage part 19a and is functioned as outputting and transmitting part 150. Control part 10b of image forming apparatus 1b executes the control program stored in storage part 19b and is functioned as key decoding part 160, block acquisition part 170, and document reproduction part 180. In addition, each part of above-mentioned image forming apparatus 1, terminal 2, and server 3 serves as hardware resources to perform the image forming method of the present disclosure. Furthermore, a part or an arbitrary combination of the above-described functional configurations may be configured as hardware such as IC, programmable logic, FPGA (Field-Programmable Gate Array), or the like.

Figure 7:
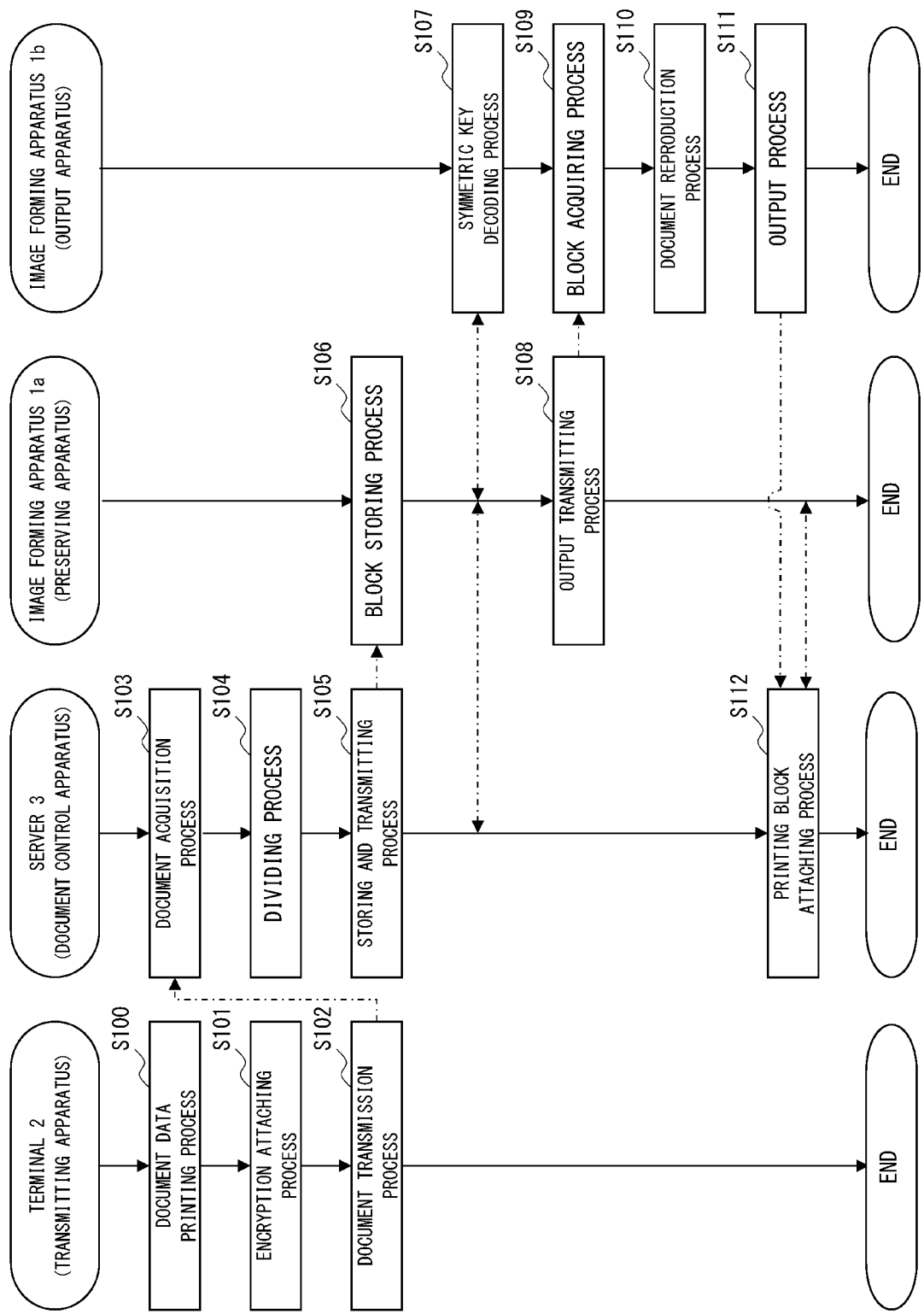
FIG. 7 is a flow chart of the distributed pull print printing process according to the embodiment of the present disclosures.

[Distributed pull print printing process by image forming system X] Then, with reference to FIG. 7, a distributed pull print process by image forming system X according to the embodiment of the present disclosures is explained. In image forming system X of the present embodiment, as mentioned above, by using terminal 2 (transmitting apparatus), server 3 (document control apparatus), image forming apparatus 1a (preserving apparatus), and image forming apparatus 1b (output apparatus), pull print is performed. In this process, in terminal 2, document data 200 is encrypted and is transmitted. Server 3 acquires this document data 200, generates blockchain C, and transmits each block 210 to image forming apparatus 1a. Then, image forming apparatus 1a acquires and stores block 210. In image forming apparatus 1b, when a user instructs output of the document data 200, each block 210 is acquired from the preserving apparatus, and document data 200 is reproduced by packing and printed. In the distributed pull print process of the present embodiment, control part 20 of terminal 2, control part 30 of server 3, and control part 10 of each image forming apparatus 1 collaborate with each part and execute the program stored in storage part 19 by using hardware resources. In the following, with reference to the flow chart of FIG. 7, the details of a distributed pull print process are explained for each step.

(Step S100)

Firstly, encryption addition part 100 of terminal 2 (transmitting apparatus) performs a document data printing process. In the various applications of terminal 2, a user creates various documents and designates a pull print on a device driver. In the present embodiment, an example that user A pull prints "document A" is explained. In that case, encryption addition part 100 generates document data 200 of "document A" by using this device driver and spools it to storage part 29, temporarily, or the like.

(Step S101)

Then, encryption addition part 100 performs encryption attaching process. Encryption addition part 100 encrypts document data 200 stored in storage part 29 with symmetric key 220. Further, encryption addition part 100 encrypts symmetric key 220 with public key 230 of the user who is permitted to be outputted document data 200. In the example of FIG. 6, user A, user B, and user C are permitted to output by pull print about "document A."

In this case, encryption addition part 100 encrypts symmetric key 220 with public key 230 of user A, user B, and user C, respectively. Encryption addition part 100 adds encrypted symmetric key 410, which is encrypted symmetric key 220, to document data 200 with the number of users as metadata.

Encryption addition part 100 also includes each user print setting 340 in document data 200 as metadata. In this case, for example, user A may have restriction that only three times, one copy, possibly-color printing within one day since creation of document data 200. On the other hand, user B may have restriction only of black-and-white printing. Such a user-specific print setting 340 can be specified for each of the document data 200 by a user who created the document data 200 or can be designated by an administrator.

(Step S102)

Then, encryption addition part 100 performs a document transmission process. Document transmission part 110 transmits document data 200, which is encrypted and is included metadata as mentioned above, to server 3, which is the document control apparatus. In addition, for this case, document transmission part 110 can also set up print setting 340 included as metadata of document data 200 for the device driver of terminal 2 of each user or server 3.

(Step S103)

Then, document acquiring part 120 in server 3 performs a document acquisition process. Document acquiring part 120 acquires encrypted document data 200 from transmitting apparatus and stores it in storage part 39, temporarily. Thereby, server 3 processes the print job from user A as follows.

(Step S104)

Then, division part 130 performs dividing process. Division part 130 generates job information 400 of document data 200 temporarily-stored in storage part 39 and stores it in storage part 39, temporarily. In the present embodiment, this job information 400 is a hash value of the encrypted entire document data 200.

Then, division part 130 divides document data 200 into blockchain C. In this case, division part 130 divides document data 200 into a plurality of blocks 210. Fixed values, such as 128 KB (kilobyte), 256 KB, and 512 KB, are used for the size of each block 210, for example. Otherwise, the size of each block 210 may be variable depending on the total number of image forming apparatuses 1 as configured image forming system X.

In an example of the present embodiment, division part 130 divides document data 200 into job block 210a and user block 210b, and, finally, generates and adds end block 210c. As shown in the example of FIG. 6, division part 130 generates job block 210a of "document A" and connects it to other job blocks 210a, which is generated, previously. In this job block 210a of "document A", job information 400 of "document A" is added to index 300, and the hash value of other job blocks 210a is set to previous hash value 320.

Further, division part 130 generates user block 210b for each authorized user. As shown in the example of FIG. 6, division part 130 generates user blocks 210b for user A, B, and C, respectively. In detail, division part 130 includes encrypted symmetric key 410 of user A, user B, and user C, which are included in the metadata of document data 200, in index 300, respectively, and generates user block 210*b*. Further, division part 130 divides and includes encrypted document data 200 in encrypted data 330 corresponding to the size of each user block 210*b*. In this case, division part 130 includes print setting 340 including settings of permission of printing for each user in user block 210*b*.

Then, division part 130 also includes end block 210*c*, which indicates the last of user block 210*b*, in blockchain C. Division part 130 calculates the hash value of the entire user block 210*b* as user block hash value 420 and includes it in this end block 210*c*. In this way, by adding end block 210*c* at the end of user block 210, it can be shown that no other permitted user is present in this job block 210*a*.

Then, division part 130 calculates and includes the present hash value 310 for each block 210. Furthermore, division part 130 includes previous hash value 320 of previous block 210 in order and generates blockchain C of document data 200.

Then, division part 130 stores job information 400 of document data 200 in management data 250. In the present embodiment, this job information 400 is the hash value of encrypted document data 200. In addition, division part 130 may store job block 210*a* in storage part 39 as a queue of a job.

(Step S105)

Then, storing and transmitting part 140 performs a storing and transmitting process. Storing and transmitting part 140 transmits each block 210 of generated blockchain C to image forming apparatus 1*a* (preserving apparatus) serving as a different node, respectively. Here, each block 210 is stored in at least two of image forming apparatuses 1*a* in the present embodiment. This is because it is possible to cope with the case where the storage apparatus storing block 210 is off-line or un-reachable. Storing and transmitting part 140 stores an IP address, ID, or the like, for a transmission destination of job block 210*a* in management data 250.

Here, storing and transmitting part 140 transmits, for example, block 210 to either image forming apparatus 1 designated by the user, image forming apparatus 1 most frequently used by the user, the nearest image forming apparatus 1 on network 5, or the like. In this case, in detail, storing and transmitting part 140 decline the priority of transmission of block 210 to the preserving apparatus that is likely in an offline state. Further, storing and transmitting part 140 increases the priority of transmission of block 210 to the preserving apparatus that has high processing capacity and/or newly installation years. In addition, storing and transmitting part 140 makes transmission of block 210 to the preserving apparatus that an error is expected suppress. Thus, since each block 210 of blockchain C is transmitted to each image forming apparatus 1*a*, which is configured as a node of image forming system X, encrypted document data 200 is distributed and is held.

(Step S106)

Then, outputting and transmitting part 150 of image forming apparatus 1*a* (preserving apparatus) performs a block storing process. Here, one process of image forming apparatus 1*a* is explained. Outputting and transmitting part 150 receives block 210 from transmitting apparatus and stores it in storage part 19*a* (storing part). Here, the number of the blocks 210 may be plural, and the order on index 300 may be uneven.

(Step S107)

Here, key decoding part 160 in image forming apparatus 1*b* (output apparatus), storing and transmitting part 140 in server 3, and Outputting and transmitting part 150 in image forming apparatus 1*a* perform symmetric key decoding process. In image forming apparatus 1*b* that is desired to output by pull print, the user logs in by using operation panel part 16. In this case, the user may connect terminal 2 with short-range wireless. Then, key decoding part 160 accesses server 3 and acquires a list of document data 200 based on management data 250. Further, on operation panel part 16, the user selects document data 200 on the list or inputs job information 400. Key decoding part 160 recognizes this, and document data 200 to pull print is selected. In addition, in the present embodiment, key decoding part 160 can also acquire the hash value of document data 200 from terminal 2.

Key decoding part 160 notifies selection of document data 200 on the list to server 3. Then, storing and transmitting part 140 of server 3 replies job information 400 of respective document data 200 to key decoding part 160. Key decoding part 160 requires user block 210*b* of the logged-in user to image forming apparatus 1*a* based on this job information 400. Then, outputting and transmitting part 150 of image forming apparatus 1*a* transmits the respective user block 210*b* to image forming apparatus 1*b*. Key decoding part 160, which is received it, acquires secret key 240 of the user from operation panel part 16 or terminal 2. Then, key decoding part 160 tries decryption of encrypted symmetric key 410 included in user block 210*b*.

Here, according to FIG. 6, for example, when user B hopes to pull print document data 200, encrypted symmetric key 410 is decrypted with secret key 240 of user B. If this decryption is successful, it part that user B is permitted printing.

(Steps S108 and S109)

If the user is permitted printing, block acquisition part 170 performs a block acquiring process. Block acquisition part 170 acquires each block 210 corresponding to the hash value of job information 400 from any one of image forming apparatuses 1*a* and stores it in storage part 19*b*. In this case, block acquisition part 170 designates the user and acquires required block 210 from image forming apparatus 1*a*. Block acquisition part 170 acquires block 210 from the last in the order of index 300, that is, in the example of the present embodiment, end block 210*c*, to the first block 210 in reverse order. Therefore, block acquisition part 170 instructs each image forming apparatus 1*a* to transmit block 210 by broadcasting, or the like, to the network 5.

Here, outputting and transmitting part 150 of image forming apparatus 1*a* (preserving apparatus) performs an output transmitting process. By the instructions from image forming apparatus 1*b*, which is an output apparatus, outputting and transmitting part 150 transmits block 210 stored in storage part 19*b* to the respective image forming apparatus 1*b*. Outputting and transmitting part 150 records the history about transmission of this block 210 on storage part 19*a*. This history includes the user to output and the number of times of transmission.

When the block 210 is acquired, block acquisition part 170 of image forming apparatus 1*b* calculates the present hash value 310 of encrypted data 330 of the respective block 210, again. Block acquisition part 170 confirms that the calculated value is the same and thus right as that of previous hash value 320 of the next block 210 in order. If these values are different, block acquisition part 170 may recognize that block 210 is altered or data is corrupted and may acquire the correct block 210 again or set it as an error. When right block 210 is acquired, block acquisition part 170 receives and acquires from the node having the previous block 210, repeatedly, and acquires all blocks 210 of the entire blockchain C.

(Step S110)

When acquired blocks 210 of blockchain C, altogether, document reproduction part 180 of image forming apparatus 1b (output apparatus) performs a document reproduction process. Document reproduction part 180 packs each of acquired block 210 to reproduce document data 200. In this case, document reproduction part 180 combines and decrypts encrypted data 330 of each block 210, thereby generates document data 200 in unencrypted state, and stores it in storage part 19c.

In the example of FIG. 6, by using symmetric key 220, which is retrieved by decrypting encrypted symmetric key 410 of user B, document data 200 of document A is decrypted. Then, document reproduction part 180 may verify the validity of document data 200 by comparing the hash value of job information 400 with the hash value of decrypted document data 200. Further, document reproduction part 180 may calculate the entire hash value of the user block 210b and compare it with user block hash value 420 of end block 210c. This makes it possible to confirm that user block 210b for the permitted user has not been tampered with.

(Step S111)

Then, output part 190 performs an output process. Here, firstly, output part 190 refers the number of printing block 210d added to user block 210b, or the like, and determines whether or not the user can output of document data 200. If the user can output document data 200 in this decision, output part 190 makes reproduced document data 200 output to a recording paper by image formation part 17. At this time, print setting 340 of the logged-in user included in user block 210b is applied, and print is performed with the settings permitted to the user. Thereby, the reproduced document data 200 can be outputted. Otherwise, output part 190 can also output document data 200 by converting the document data 200 into a file such as PDF, FAX transmission, sending by e-mail or messenger, or the like, by the print setting 340. Output part 190 is reported to server 3 when the output is completed. In addition, if the user cannot output document data 200, the fact is notified to the user on operation panel unit 16.

(Step S112)

Then, division part 130 of server 3 performs printing block attaching process. Division part 130 adds printing block 210d, which indicates record of an output, to user block 210b. Here, in image forming system X of the present embodiment, it do not allow the user to print more times than the permitted number of times, the number of sheets, or the like. For this reason, for example, when one block is added to print block 210d, one document has been printed is recorded.

In the example of FIG. 6, in blockchain C of document data 200, printing block 210d is added to user block 210b of the logged-in user. In this case, about addition of printing block 210d, division part 130 designates the user who logged in and requests a plurality of image forming apparatuses 1a (preserving apparatus) for confirmation. Outputting and transmitting part 150 of image forming apparatus 1a refers to the history of transmission of block 210 and, for example, if the number of output times, the number of copies, the time, or the like, has reached the restriction, output transmitting part 150 does not approve the addition of printing block 210d. That is, outputting and transmitting part 150 of image forming apparatus 1a can be used as like a "miner" in blockchain. On the contrary, outputting and transmitting part 150 of image forming apparatus 1a approves addition of printing block 210d if it has not reached at restriction. Outputting and transmitting part 150 notifies the result of the approval or unapproved to server 3 and the output apparatus. As the above-mentioned, the distributed pull print printing process according to the embodiment of the present disclosures is ended.

As configured as described above, the following effects can be obtained. In a typical image forming system allowing pull print, client server environment is required. That is, a server that transmits document data from a terminal is needed. In this server, the storage capacity for storing a lot of document data is required. On the other hand, in a typical network scanning system, scanned data is managed among distributed memory storage. However, this system cannot support pull print. As compared with this, image forming system X according to the embodiment of the present disclosures includes terminal 2 (transmitting apparatus), a plurality of image forming apparatuses 1a (preserving apparatus), and image forming apparatus 1b (output apparatus) and can be pull printed. Terminal 2, which is the transmitting apparatus, includes: an encryption addition part 100 is configured to encrypt document data 200 for outputting by pull print with symmetric key 220, encrypts the symmetric key 220 by a public key 230 of a user who is permitted to output of the document data 200, and adds the encrypted symmetric key 220 to the document data 200, and a document transmission part 110 is configured to transmit the document data 200 encrypted by the encryption addition part 100 to the document control apparatus. Server 3, which is a document control apparatus, includes: a document acquiring part 120 configured to acquire the encrypted document data 200 from the transmitting apparatus, a division part 130 configured to generate a blockchain C of the document data 200 by dividing the document data 200 acquired by the document acquiring part 120 into a job block 210a having information of the document data 200 and a user block 210b having the symmetric key 220 encrypted by the public key 230 of the user and by calculating and including a previous hash value 320 of a previous block 210 in order, a storing and transmitting part 140 configured to transmit each of the block 210 divided by the division part 130 to at least two of preserving apparatuses. Image forming apparatus 1a, which is a preserving apparatus, includes: a storing part configured to store the block 210 received from the document control apparatus, and an outputting and transmitting part 150 configured to transmit the block 210 stored in the storing part according to an instruction from the output apparatus. Image forming apparatus 1b, which is an output apparatus, includes: a key decoding part 160 configured to decrypt the symmetric key 220 included in the user block 210b by a secret key 240 of the user, a block acquisition part 170 configured to acquire the other blocks 210 from each of the preserving apparatuses when the symmetric key 220 is decoded by the key decoding part 160, a document reproduction part 180 configured to pack each block 210 acquired by the block acquisition part 170 and reproduce the document data 200, and an output part 190 configured to output the document data 200 reproduced by the document reproduction part 180. As configured in this way, the distributed type image forming system for pull print, which can reduce a server storage capacity, can be provided. That is, even if the small built-in server, or the like, is used, a distributed image forming system can be configured, and thereby, printing by pull print can be attained.

In addition, server 3 of the present embodiment does not need to manage a user, directly. Even in this case, in the present embodiment, print setting 340 can be controlled by blockchain C. Therefore, in image forming system X of the present embodiment, it is not necessary to register the user in advance for printing document data 200. That is, even for new user, printing can be permitted only by setting to document data 200, and the user who is permitted to print document data 200 can be controlled without using the server for user management for exclusive use, or the like. Also, image forming system X of the present embodiment is possible to avoid the overhead of maintaining the authentication state by permitting access to the user. Furthermore, by restricting access to the file, not access to the system, security can be strengthened. In addition, in the present embodiment, it is possible to restrict an output without managing a user, directly, and a maintenance cost can be reduced.

Also, in a typical image forming system allowing pull print, all the files are transmitted and stored in the server. In this case, the file preserved in the server is not encrypted, usually. Therefore, it may not be safe when the file is transmitted or stored. Furthermore, there is no verification for the preserved file. That is, since the stored file can be read and written, it does not have the guarantee that the file to be printed is the file, which is transmitted, firstly, and is not able to check justification. Specifically, the administrator of such a system could read/write access, directly, to the stored file by referring to the directory of the server. That is, the administrator, a hacker, or the like, may alter the preserved file and is not able to detect this. On the other hand, in image forming system X of the present embodiment, in view of the structure of the blockchain, there is no administrator privilege that can access all the stored document data 200. That is, only the owner or the creator of the document data 200 and the designated user can output document data 200. Therefore, security can be strengthened.

Also, in the typical image forming system, the administrator can display and browse the preserved file. As compared with this, in image forming system X of the present embodiment, document data 200 is encrypted before transmission to server 3, and thus information leakage can be prevented. Further, since symmetric key 220 is encrypted by public key 230 of a user and is transmitted, only the user can decrypt the document data 200. Accordingly, safety can be improved as compared with a case where only symmetric key 220 is used. In addition, the justification of document data 200 can be guaranteed by using the hash and the encryption.

Also, in a typical image forming system, since document data 200 transmitted to the server is deleted after it is printed, it has been printed only once. Therefore, it is impossible to permit multiple users to print the same file. As compared with this, in the image forming system X of the present embodiment, it is possible to set a plurality of users who permit to print. That is, a plurality of users designated in print setting 340 can print the same document data 200. Thus, the user does not have to upload the same file in order to allow many users to print.

In addition, in image forming system X of the present embodiment, since blocks 210 are collected from a lot of preserving apparatuses serving as nodes, band width and time are reduced, and cost can be reduced rather than collecting blocks 210 via a server. Furthermore, in the present embodiment, as the blockchain C, block 210 is stored and held such that document data 200 is scattered over the entirely different nodes. Therefore, changing or hacking of document data 200 becomes difficult. That is, the accuracy of document data 200 can be guaranteed.

Furthermore, in a typical technology, the time to completion of printing is influenced depending on the state of the server. As compared with this, in image forming system X of the present embodiment, block 210 is preserved with a plurality of preserving apparatuses serving as nodes. Therefore, even if one preserving apparatus is off-line or operation is slowed in the busy state, block 210 is acquirable from the preserving apparatus that can transmit soon. As a result, a possibility that document data 200 can be pull printed in short time increases. Furthermore, in image forming system X of the present embodiment, block 310, which configures a blockchain, is not replicated, and a copy, or the like, are not performed after transmission. Therefore, even in the distributed type, the bandwidth and the storage capacity of the storage apparatus can be reduced.

In image forming system X according to the embodiment of the present disclosures, the division part 130 includes a print setting 340 having settings of permission of printing for each user in the user block 210*b*. As configured in this way, in case that a user pull prints, even if it uses the same document data 200, it becomes possible to make printing corresponding to print setting 340 perform. Thereby, the storage capacity of each preserving apparatus is reducible.

In image forming system X according to the embodiment of the present disclosures, the dividing part 130 includes an end block 210*c* indicating end of the user block 210*b* in the blockchain C. As configured in this way, even if the user block 210*b* is altered or data corruption, or the like, occurs, it can be confirmed by hash value. Accordingly, even if unjust user block 210*b* is mixed, an alteration, hacking, or the like, of document data 200 can be prevented.

In image forming system X according to the embodiment of the present disclosures, the output part 190 adds printing block 210*d* indicating record of an output to the user block 210*b*. As configured in this way, by adding a blockchain also under user block 210*b*, a blockchain of two-dimensional structure including job block 210*a* and user block 210*b* is available. Thereby, it is possible to leave a record of, for example, how much printing has been done for each user, management of printing by pull print can be improved, and injustice can be prevented.

In image forming system X according to the embodiment of the present disclosures, the output part 190 requests the plurality of image forming apparatuses 1*a* (preserving apparatus) for confirmation about addition of the printing block 210*d*. As configured in this way, by confirming with each image forming apparatus 1*a*, unauthorized printing by pull printing can be prevented. That is, even if one image forming apparatus 1 is hacked, or the like, fraudulence can be detected with other image forming apparatuses 1, and security can be strengthened.

In image forming system X according to the embodiment of the present disclosures, the block acquisition part 170 calculates the previous hash value 320 from last block 210 in the order, repeatedly, and acquires the right block 210. As configured in this way, addition of unjust block 210, or the like, can be prevented, and security can be strengthened.

In image forming system X according to the embodiment of the present disclosures, transmitting apparatus is terminal 2 in which a user creates document data 200, a document control apparatus is server 3 for pull print, and a preserving apparatus and an output apparatus are image forming apparatuses 1. As configured in this way, with the equivalent configuration as the typical pull print, which terminal 2 prints to server 3, a distributed type pull print is realizable.

Other Embodiments

In addition, in the above-mentioned embodiment, an example where server 3 is used as a document control apparatus, and document data 200 is divided into blockchain C and transmitted it is described. However, instead of server 3, by image forming apparatus 1 or terminal 2, a process that document data 200 is divided into block 210 and transmits to image forming apparatus 1*a* serving as a preserving apparatus may be performed. Thereby, it becomes unnecessary to process document data 200 in server 3, and it can reduce a processing load. Furthermore, it is unnecessary to send and receive a hash value, or the like, of document data 200 between server 3 and image forming apparatus 1, and it is possible to reduce the transmission burden and processing burden of the network.

In the above-mentioned embodiment is written of the configuration that uses server 3 for exclusive use. However, as a configuration in the image forming apparatus 1, a process similar to that of the server 3 may be executed. In this case, the application that realizes function of server 3 may be installed and executed in image forming apparatus 1. As configured in this way, a pull print is realizable even if it does not use server 3 as an apparatus for exclusive use. Also, it is possible to configured that, when terminal 2 is moved, it may be connected with image forming apparatus 1 instead of server 3 from image forming apparatus 1*b* in various positions. As configured in this way, the dispersibility of block 210 increases, and a possibility of reconstructing document data 200 from blockchain C can be improved.

In the above-mentioned embodiment, an example that document data 200 is encrypted and transmitted in terminal 2 is described. However, document data 200 does not need to be encrypted. Even in such a case, each block 210 may include encrypted data 330. If document data 200 is not encrypted, job information 400 itself may be encrypted and added, and division part 130 may acquire the hash value before document data 200 is encrypted. In addition, in previous hash value 320 of block 210, for example, the hash value of entire document data 200 in the state of not encrypted may be set. As configured in this way, various pull print configuration can be supported.

In the above-mentioned embodiment, it is described that terminal 2 encrypts symmetric key 220 by public key 230 of the user. Further, an example in which public key 230 of the user is included as metadata in document data 200 is described. However, a configuration that stores symmetric key 220 and/or public key 230 of the user only in server 3 is also possible. In this case, server 3 may acquire document data 200, which is not encrypted, from terminal 2, or the like, may encrypt document data 200 with symmetric key 220, and may encrypt symmetric key 220 by public key 230 of the user. As configured in this way, the security risk by disclosure of symmetric key 220 from terminal 2 can be reduced.

Further, in the above-mentioned embodiment, an example that the hash value of the entire document data 200 is used as job information 400 of document data 200 is described. However, job information 400 of document data 200 may be sufficient that the hash value of end block 210*c*, which is final block 210 of blockchain C. As configured in this way, it becomes easy to identify end block 210*c*, and the possibility that the blockchain C can be acquired more quickly increases. Also, since it becomes unnecessary to be written of order, or the like, in index 300 of each block 210, the length of blockchain C becomes hard to be guessed, and it comes to be hard of hacking, or the like. In addition, job information 400 of document data 200 may be merely a unique character string, key information of a random number, or the like.

In the above-mentioned embodiment, it is described that encrypted symmetric key 410 is included in user block 210*b*. However, including encrypted symmetric key 410 in job block 210*a* is also possible. Thereby, encrypted symmetric key 410 can be decrypted only by acquiring job block 210*a* of document data 200. In addition, end block 210*c* may be configured to include encrypted symmetric key 410 or to use a dedicated block 210.

Furthermore, in the above embodiment, it is described that encrypted data 330 is included in user block 210*b* for each user. However, different encrypted data 330 may be included in user block 210*b*, respectively. In this case, only one encrypted document data 200 may be included in the entire blockchain. As configured in this way, security can further be raised.

Further, in the above-mentioned embodiment, it is written that job information 400 is indicated to the user by using terminal 2. However, job information 400 may be indicated on the display part of operation panel part 16, or job information 400 may be printed in image formation part 17. As configured in this way, user can acquire job information 400 in passing when direct printing of other printed matter is performed from terminal 2, or the like. Accordingly, convenience can be improved. Furthermore, a configuration that inputs job information 400 by connecting terminal 2 to the output apparatus in short-range wireless, USB, or the like, directly, and pull prints document data 200 is also possible.

Otherwise, job information 400 may include the ID, or the like, of the user permitted to output. Thereby, when the user only logs in with image forming apparatus 1*b* (output apparatus), blockchain C can be designated. In this case, it becomes unnecessary to input job information 400, separately.

Encryption addition part 100 may also include public key 230 itself in document data 200 as metadata. That is, encryption addition part 100 creates metadata including public key 230 of user A, user B, and user C and adds it to document data 200. In this case, public key 230 of each user permitted to pull print may be included in print setting 340. As configured in this way, the user can be identified by the public key 230.

In the above-mentioned embodiment, an example that storing and transmitting part 140 of terminal 2, which is transmitting apparatus, transmits block 210 only to image forming apparatus 1*a* selected as the preserving apparatus is described. However, storing and transmitting part 140 can transmit block 210 also to image forming apparatus 1, which is not selected as image forming apparatus 1*a*. In addition, division part 130 may be broadcast to all the image forming apparatuses 1 about blockchain C having been generated. As configured in this way, even if block 210 is not stored in each image forming apparatus 1 serving as each node of image forming apparatus X, the existence of block 210 itself is recordable for a history, or the like.

Also, the present disclosure is applicable to information processing apparatus other than an image forming apparatus. That is, it may be a configuration by using network scanner, a server connected with a scanner by USB, separately, or the like.

Also, the configuration and operation of the above-mentioned embodiment is an example, and it cannot be overemphasized that it can change suitably and can execute in the range which does not deviate from the aim of the present disclosure.

What is claimed is:

1. An image forming system including a transmitting apparatus, a document control apparatus, a preserving apparatus, and an output apparatus and allowing to pull print,
the transmitting apparatus comprising:
an encryption addition part configured to encrypt a document data for outputting by pull print with a symmetric key, encrypt the symmetric key by a public key of a user who is permitted to output of the document data, and add the encrypted symmetric key to the document data, and
a document transmission part configured to transmit the document data encrypted by the encryption addition part to the document control apparatus;
the document control apparatus comprising:
a document acquiring part configured to acquire the encrypted document data from the transmitting apparatus,
a division part configured to generate a blockchain of the encrypted document data by a) dividing the encrypted document data acquired by the document acquiring part into a job block having information of the document data and a user block having the symmetric key encrypted by the public key of the user and by b) calculating and including a previous hash value of a previous block in order, and
a storing and transmitting part configured to transmit each of the blocks into which the encrypted document data was divided by the division part to at least two preserving apparatuses;
the preserving apparatus being configured to receive a block from the document control apparatus, comprising:
a storing part configured to store the block received from the document control apparatus, and
an outputting and transmitting part configured to transmit the block stored in the storing part according to an instruction from the output apparatus; and
the output apparatus comprising:
a key decoding part configured to decrypt the symmetric key included in the user block by a secret key of the user,
a block acquisition part configured to acquire other blocks from the preserving apparatuses when the symmetric key is decoded by the key decoding part,
a document reproduction part configured to pack each of the other blocks acquired by the block acquisition part and reproduce the document data, and
an output part configured to output the document data reproduced by the document reproduction part.

2. The image forming system according to claim 1, wherein
the division part includes a print setting having settings of permission of printing for each user in the user block.

3. The image forming system according to claim 1, wherein
the dividing part includes an end block indicating end of the user block in the blockchain.

4. The image forming system according to claim 1, wherein
the output part adds a printing block indicating record of an output to the user block.

5. The image forming system according to claim 4, wherein
the output part requests the plurality of preserving apparatuses for confirmation about addition of the printing block.

6. The image forming system according to claim 1, wherein
the block acquisition part
calculates the previous hash value from last block in the order, repeatedly, and acquires the right block.

7. The image forming system according to claim 1, wherein
the transmitting apparatus is a terminal in which the user creates the document data,
the document control apparatus is a server for pull print, and
the preserving apparatus and the output apparatus are image forming apparatuses.

8. An image forming method executed by an image forming system including a transmitting apparatus, a document control apparatus, a preserving apparatus, and an output apparatus and allowing for pull print, comprising the steps of:
by the transmitting apparatus, encrypting a document data for outputting by pull print with a symmetric key, encrypting the symmetric key by a public key of a user who is permitted to output of the document data, and adding the encrypted symmetric key to the document data;
by the transmitting apparatus, transmitting the encrypted document data to the document control apparatus;
by the document control apparatus, acquiring the encrypted document data from the transmitting apparatus;
by the document control apparatus, generating a blockchain of the document data by a) dividing the acquired encrypted document data into a job block having information of the document data and a user block having the symmetric key encrypted by the public key of the user and by b) calculating and including a previous hash value of a previous block in order;
by the document control apparatus, transmitting each of the blocks into which the encrypted document data was divided to at least two preserving apparatuses;
by the preserving apparatus, receiving a block from the document control apparatus and storing the block received from the document control apparatus;
by the preserving apparatus, transmitting the stored block according to an instruction from the output apparatus;
by the output apparatus, decrypting the symmetric key included in the user block by a secret key of the user;
by the output apparatus, acquiring other blocks from the preserving apparatuses when the symmetric key is decoded;
by the output apparatus, packing each of the acquired other blocks and reproducing the document data; and
by the output apparatus, outputting the reproduced document data.

9. The image forming method according to claim 8, further comprising a step of:
including a print setting having settings of permission of printing for each user in the user block.

10. The image forming method according to claim 8, further comprising a step of:
including an end block indicating end of the user block in the blockchain.

11. The image forming method according to claim 8, further comprising a step of:
  adding a printing block indicating record of an output to the user block.

12. The image forming method according to claim 11, further comprising a step of:
  requesting the at least two preserving apparatuses for confirmation about addition of the printing block.

13. The image forming method according to claim 11, further comprising a step of:
  calculating the previous hash value from last block in the order, repeatedly, and acquiring the right block.

* * * * *